(12) United States Patent
Guo

(10) Patent No.: US 11,091,224 B2
(45) Date of Patent: Aug. 17, 2021

(54) BICYCLE DERAILLEUR, OPERATING METHOD THEREOF, AND BICYCLE

(71) Applicant: Zhaotian Guo, Fujian (CN)

(72) Inventor: Zhaotian Guo, Fujian (CN)

( * ) Notice: Subject to any disclaimer, the term of this patent is extended or adjusted under 35 U.S.C. 154(b) by 277 days.

(21) Appl. No.: 16/447,989

(22) Filed: Jun. 21, 2019

(65) Prior Publication Data

US 2019/0359287 A1    Nov. 28, 2019

Related U.S. Application Data

(63) Continuation of application No. PCT/CN2017/120057, filed on Dec. 29, 2017.

(30) Foreign Application Priority Data

Jan. 4, 2017    (CN) .......................... 201720005566.2

(51) Int. Cl.
   *B62M 11/06*    (2006.01)
   *F16H 3/089*    (2006.01)

(52) U.S. Cl.
   CPC .................... *B62M 11/06* (2013.01)

(58) Field of Classification Search
   CPC .............................. F16H 3/089; B62M 11/06
   USPC .......................................................... 74/333
   See application file for complete search history.

(56) References Cited

U.S. PATENT DOCUMENTS

| | | | |
|---|---|---|---|
| 3,863,503 A | 2/1975 | Loeb et al. | |
| 5,496,049 A * | 3/1996 | Escobedo | B62M 11/04 280/238 |
| 5,622,081 A * | 4/1997 | Clements | B62M 11/04 280/238 |
| 6,112,609 A * | 9/2000 | Brown | B62M 17/00 280/260 |
| 6,755,431 B2 | 6/2004 | Chang | |
| 6,786,497 B1 * | 9/2004 | Olszewski | B62M 11/12 280/260 |
| 7,434,489 B1 * | 10/2008 | Scranton | B62M 17/00 280/236 |

(Continued)

FOREIGN PATENT DOCUMENTS

| | | |
|---|---|---|
| CN | 1899913 | 1/2007 |
| CN | 204399434 | 6/2015 |
| CN | 206407061 | 8/2017 |

*Primary Examiner* — Ha Dinh Ho
(74) *Attorney, Agent, or Firm* — JCIP Global Inc.

(57) ABSTRACT

A bicycle derailleur is provided with a front gear plate and a rear gear plate. A small gear of the front gear plate corresponds to a big gear of the rear gear plate to form a low-speed gear, and a big gear of the front gear plate corresponds to a small gear of the rear gear plate to form a high-speed gear. A transmission box is arranged between the front gear plate and the rear gear plate, and a clutch lever can be controlled to enable the front gear plate to move forwards to be separated from the transmission box or to move backwards to be engaged with the transmission box. A gear case fixed to an edge of a triangular bracket is disposed around a middle of the transmission box. A top of the transmission box penetrates through the gear case to be movably connected to a gear shift lever. The clutch lever and the gear shift lever can be controlled to enable the transmission box to move forwards, backwards, leftwards, or rightwards in the gear case to reach a desired gear.

28 Claims, 2 Drawing Sheets

(56) References Cited

U.S. PATENT DOCUMENTS 10,232,908 B2 * 3/2019 Xu .................... F16D 3/843

* cited by examiner

BICYCLE DERAILLEUR, OPERATING METHOD THEREOF, AND BICYCLE

CROSS-REFERENCE TO RELATED APPLICATION

This application is a continuation of international PCT application serial no. PCT/CN2017/120057, filed on Dec. 29, 2017, which claims the priority benefit of China application no. 201720005566.2, filed on Jan. 4, 2017. The entirety of each of the above-mentioned patent applications is hereby incorporated by reference herein and made a part of this specification.

BACKGROUND

Technical Field

The invention relates to the field of bicycles, in particular to a bicycle derailleur, an operating method thereof, and a bicycle.

Description of Related Art

At present, many bicycle derailleurs realize speed shifting in such a manner: a plurality of gears having different sizes are arranged in the front and back and are in transmission through a chain, and the chain is controlled to change the combination of the front gears and rear gears, so as to change the speed ratio.

These bicycle derailleurs, which are commonly adopted for the present, are convenient to use and practical in speed change, but still have the drawbacks of complex structure, high manufacturing cost, difficult maintenance, chain disengagement and breakage, and unavailability of flexible and diversified variations in tooth number difference, tooth ratio, as well as speed ratio.

SUMMARY

One objective of the invention is to provide a bicycle derailleur which is simple in structure, low in manufacturing cost, durable, free of chain disengagement and breakage, and capable of changing the speed ratio more flexibly.

Another objective of the invention is to provide an operating method of a bicycle derailleur to fulfill the advantages of the bicycle derailleur mentioned above.

Another objective of the invention is to provide a bicycle, which is provided with the bicycle derailleur mentioned above and is capable of eliminating chain disengagement and breakage and capable of changing the speed ratio more conveniently and flexibly.

Embodiments of the invention are implemented as follows.

A bicycle derailleur is provided with a front gear plate and a rear gear plate, wherein a small gear of the front gear plate corresponds to a big gear of the rear gear plate to form a low-speed gear, and a big gear of the front gear plate corresponds to a small gear of the rear gear plate to form a high-speed gear.

A number of gears of the front gear plate is equal to a number of gears of the rear gear plate, and distances between the gears of the front gear plate and corresponding of the gears of the rear gear plate are equal.

A clutch lever can be controlled to enable the front gear plate to move forwards to be separated from a transmission box or to move backwards to be engaged with the transmission box.

The transmission box is arranged between the front gear plate and the rear gear plate, a group of small gears are linearly arranged in the transmission box, a number of the small gears in the transmission box is an odd number, and tails of the small gears located at two ends of the transmission box are exposed out of the transmission box and are engaged with the front gear plate and the rear gear plate.

A gear case fixed to an edge of a triangular bracket is disposed around a middle of the transmission box, a top of the transmission box penetrates through the gear case to be movably connected to a gear shift lever, and the clutch lever and the gear shift lever can be controlled to enable the transmission box to freely move forwards, backwards, leftwards or rightwards in the gear case to reach a desired gear.

Furthermore, in a preferred embodiment, the front gear plate moves forwards to be separated from the transmission box by a distance of 1.5 cm to 2.5 cm.

Furthermore, in a preferred embodiment, the front gear plate moves forwards to be separated from the transmission box by a distance of 2 cm.

Furthermore, in a preferred embodiment, the number of gears correspondingly arranged on each of the front gear plate and the rear gear plate is more than one, and the gears arranged on the front gear plate are in one-to-one correspondence with the gears arranged on the rear gear plate.

Furthermore, in a preferred embodiment, five gears having different numbers of teeth are correspondingly arranged on each of the front gear plate and the rear gear plate, and the five gears correspondingly arranged on the front gear plate are in one-to-one correspondence with the five gears correspondingly arranged on the rear gear plate to form five speed gears.

Furthermore, in a preferred embodiment, the gear case is disposed around the transmission box and is provided with, from inside to outside, strip-shaped gear grooves corresponding to the five speed gears.

Furthermore, in a preferred embodiment, a control panel matched with the gear shift lever and the clutch lever is arranged on a bicycle beam.

Preferably, in a preferred embodiment, a bolt lock used for controlling a lock state of the clutch lever is arranged on the control panel.

Furthermore, in a preferred embodiment, the gear shift lever is hinged to a rear oblique beam of the triangular bracket and sequentially comprises, in a length direction, a control arm section at an upper end and a driven arm section at a lower end, and the control arm section and the driven arm section move oppositely.

Furthermore, in a preferred embodiment, the gear shift lever formed by the control arm section and the driven arm section is a labor-saving lever.

Furthermore, in a preferred embodiment, the clutch lever is hinged to a front oblique beam of the triangular bracket and is partitioned by a hinge point into a driving clutch control arm and a driven clutch control arm.

Furthermore, in a preferred embodiment, the clutch lever formed by the driving clutch control arm and the driven clutch control arm is a labor-consuming lever.

Furthermore, in a preferred embodiment, the driving clutch control arm and the driven clutch control arm are not located on the same axis.

An operating method of a bicycle derailleur particularly comprises following steps.

Controlling a clutch lever to drive a front gear plate to move forwards, so that gears of the front gear plate are separated from gears of a transmission box;

Controlling a gear shift lever to drive the transmission box to move forwards, backwards, leftwards, or rightwards in a gear case; and Controlling, after the transmission box moves to a target position in the gear case, the clutch lever to drive the front gear plate to move backwards to be engaged with the transmission box.

Furthermore, in a preferred embodiment of the invention, before being controlled to drive the front gear plate to move forwards, the clutch lever is locked; correspondingly, before the clutch lever is controlled to drive the front gear plate to move forwards, a corresponding bolt lock is unlocked first to set the clutch lever free; and when the front gear plate is engaged with the transmission box, the clutch lever is locked by the bolt lock, so that power is stably transmitted between the front gear plate and the transmission box.

Furthermore, in a preferred embodiment, the clutch lever drives the front gear plate to move forwards by a distance of 2 cm.

A bicycle is provided with the abovementioned bicycle derailleur mentioned.

The embodiment of the invention has following beneficial effects. The bicycle derailleur in this embodiment is provided with the gear plates, the transmission box, the gear case, and the like, thereby being simple in structure, durable, and free of chain disengagement and breakage; particularly, the speed ratio can be instantly changed only by control over the clutch lever and the gear shift lever, the gear can be shifted easily, and thus, the bicycle derailleur has the characteristics of being easy to operate, convenient to use, and practical. Therefore, the bicycle derailleur, the operating method thereof, and the bicycle in this embodiment have high market application and promotion value.

BRIEF DESCRIPTION OF THE DRAWINGS

In order to more clearly explain the technical solutions of embodiments of the invention, a brief description of the drawings involved in the embodiments is given below. It would appreciate that the following drawings are used to illustrate certain embodiments only, and are not intended to limit the scope of the invention. Those ordinarily skilled in this field can obtain other relevant drawings on the basis of these illustrative ones without creative work.

DESCRIPTION OF THE EMBODIMENTS

Figure 1:
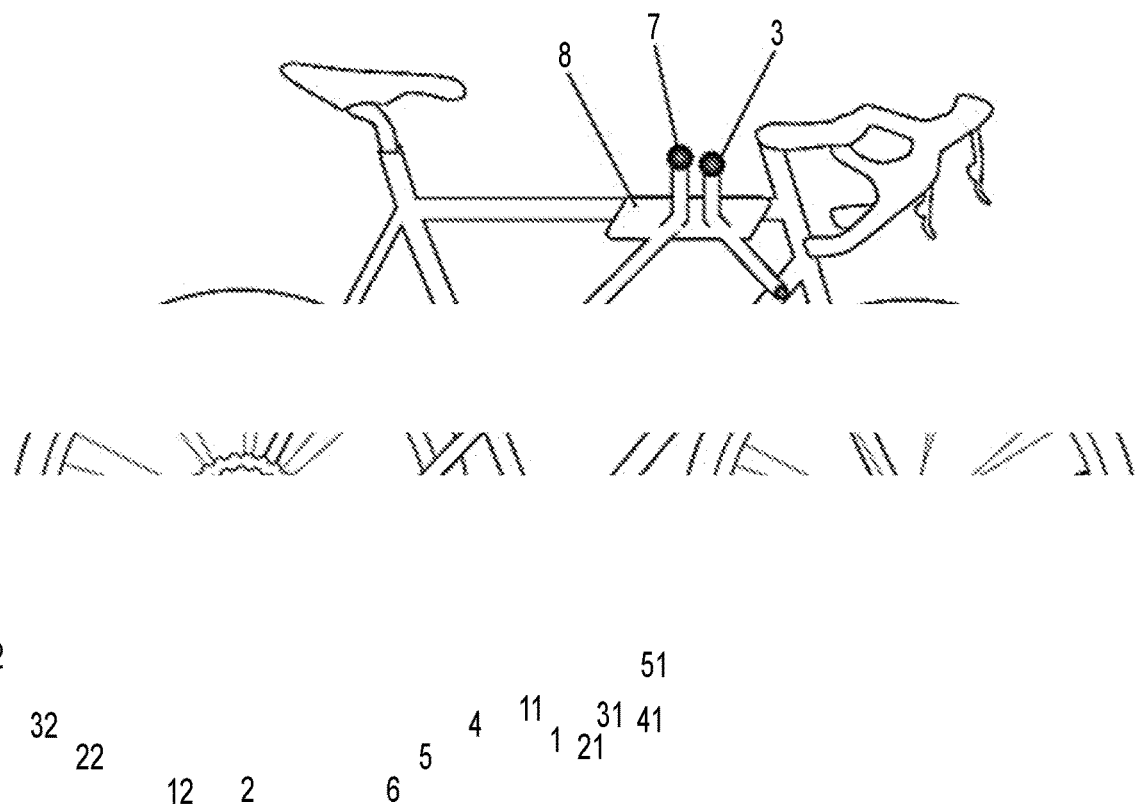
FIG. 1 is a front view of an embodiment of the invention.

To make the objectives, technical solutions and advantages of the embodiments of the invention clearer, the technical solutions of the embodiments of the invention are clearly and completely described below with reference to their accompanying drawings. Obviously, the embodiments in the following description are only certain illustrative ones, and are not all possible ones of the invention. Generally, the components of the embodiments described and illustrated by these drawings can be configured and designed in different manners.

Therefore, the detailed description of the embodiments shown in the drawings is not intended to limit the protection scope of the invention, and is only for illustrating specified embodiments of the invention. All other embodiments obtained by those ordinarily skilled in the art on the basis of these illustrative ones without creative work should also fall within the protection scope of the invention.

It should be noted that similar reference signs and letters in the following drawings represent similar items, and once a certain item is defined in one drawing, it will not be further defined or explained anymore in the subsequent drawings.

It should be pointed out that directional or positional relations indicated by terms such as "inner", "outer", and "horizontal" in this description, or directional or positional relations shown in the accompanying drawings, or common directional or positional relations of the product of the invention in use are provided only for the sake of a convenient and brief description of the invention, and are not for the purpose of indicating or implying essential specific directions or configuration and operation in specific directions of devices or elements referred to, and thus, should not be interpreted as limitations to the invention. In addition, terms such as "first", "second", and "third" are used for a distinctive description only, and are not for indicating or implying relative importance.

What should also be pointed out, in the description of the invention, is that unless otherwise explicitly specified and defined, terms such as "arrange", "install", and "connect" should be extensively understood, for instance, "connect" may refer to fixed connection, detachable connection, integral connection, mechanical connection, electrical connection, direct connection, indirect connection with intermediates, or internal communication of two elements. Those ordinarily skilled in this field shall appreciate the specific meanings of these terms in accordance with specific conditions.

The invention is further described below with reference to the accompanying drawings and embodiments.

One embodiment of the invention provides a bicycle derailleur, mainly relating to the field of bicycles. The bicycle derailleur in this embodiment is simple in structure, low in manufacturing cost, durable, and free of chain disengagement and breakage, and capable of changing the speed ratio more flexibly, thereby having high application and promotion value.

Figure 2:
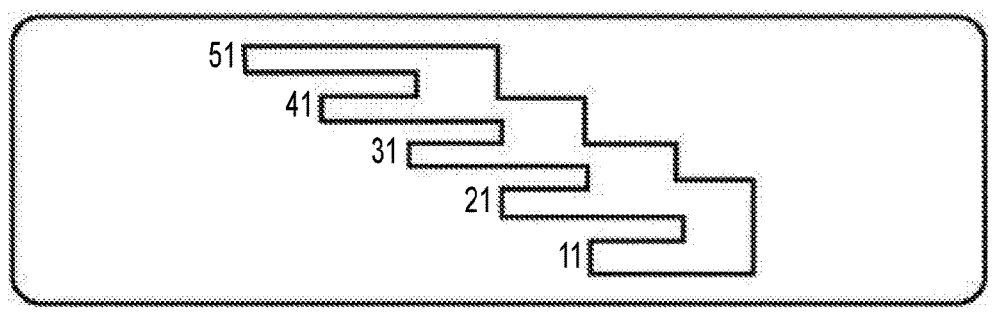
FIG. 2 is a top view of a gear case in the embodiment of the invention.
Figure 3:
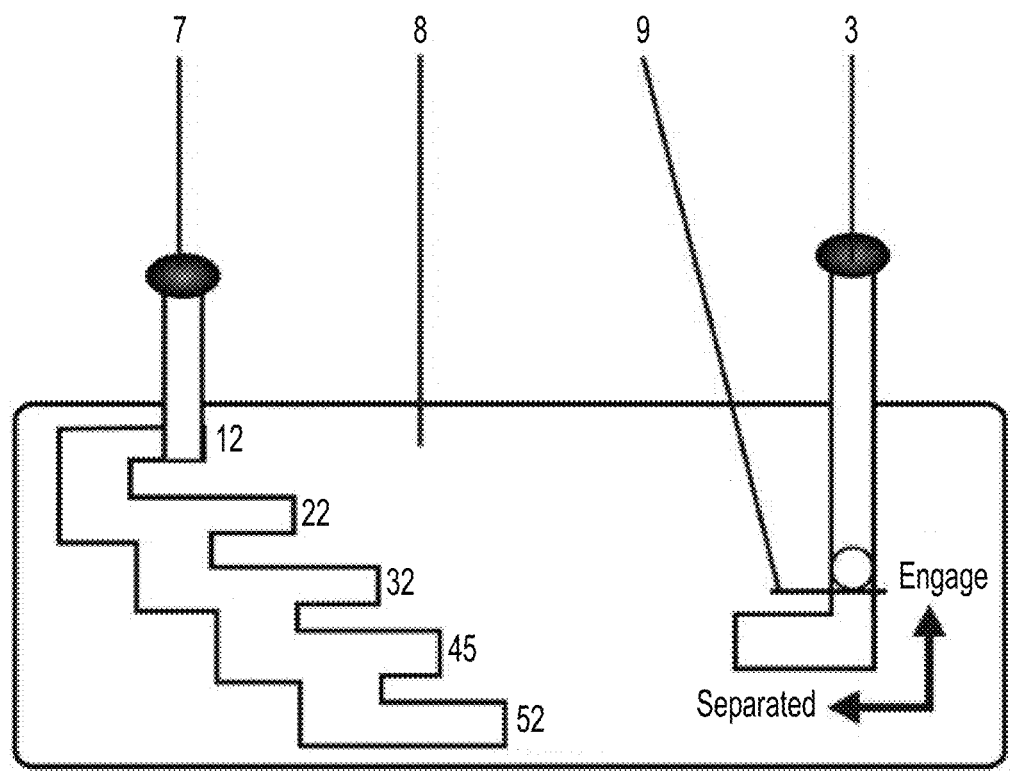
FIG. 3 is a top view of a control panel in the embodiment of the invention.

Particularly, referring to FIG. 1, FIG. 2, and FIG. 3, the bicycle derailleur in this embodiment is provided with a front gear plate 1 and a rear gear plate 2, wherein a small gear of the front gear plate 1 corresponds to a big gear of the rear gear plate 2 to form a low-speed gear, and a big gear of the front gear plate 1 corresponds to a small gear of the rear gear plate 2 to form a high-speed gear. A number of gears of the front gear plate 1 is equal to a number of gears of the rear gear plate 2, and distances between the gears of the front gear plate 1 and corresponding of the gears of the rear gear plate 2 are equal.

Furthermore, referring to FIG. 1 again, a transmission box 4 is arranged between the front gear plate 1 and the rear gear plate 2. A group of small gears are linearly arranged in the transmission box 4, and a number of the small gears is an odd number. Tails of the small gears located at two ends of the transmission box 4 are exposed out of transmission box 4 and are engaged with the front gear plate 1 and the rear gear plate 2.

Particularly, referring to FIG. 1 and FIG. 3, the bicycle derailleur in this embodiment is further provided with a clutch lever 3 which can be controlled to enable the front gear plate 1 to move forwards to be separated from the transmission box 4 or to move backwards to be engaged with the transmission box 4.

Furthermore, referring to FIG. 1 and FIG. 2, a gear case 5 fixed to an edge of a triangular bracket is disposed around the middle of the transmission box 4 in this embodiment, a top 6 of the transmission box 4 penetrates through the gear case 5 to be movably connected to a gear shift lever 7, and the clutch lever 3 and the gear shift lever 7 can be controlled to enable the transmission box 4 to freely move forwards, backwards, leftwards, or rightwards in the gear case 5 to reach a desired gear, so that flexible and rapid gear shifting is realized.

Furthermore, the clutch lever 3 can be controlled to enable the front gear plate 1 to move forwards by a distance of about 2 cm (in actual design, a forward moving distance of the front gear plate 1 can be adjusted to 1.5 cm to 2.5 cm as needed). By the way, the reason why the forward moving distance of the front gear plate 1 should be limited is that a proper distance is necessary to completely separate the front gear plate 1 from the transmission box 4 and to still keep the front gear plate 1 being separated from the transmission box 4 during gear shifting. The forward moving distance of the front gear plate 1 is not defined within a wide range for one reason that it is not necessary and for another reason that this is beneficial to control over the clutch lever 3.

More particularly, referring to FIG. 1 again, as for the two gear plates (the front gear plate 1 and the rear gear plate 2) which are formed by a plurality of gears having different numbers of teeth, a small gear 11 of the front gear plate 1 corresponds to a big gear 12 of the rear gear plate 2 to form a first low-speed gear, a big gear 51 of the front gear plate 1 corresponds to a small gear 52 of the rear gear plate 2 to form a fifth high-speed gear, and other speed gears are formed by analogy. Particularly, referring to FIG. 2 and FIG. 3 in which reference signs 21, 31, and 41 represent gears of the front gear plate 1 and reference signs 22, 32, and 42 represent gears of the rear gear plate 2, the small gear 21 of the front gear plate 1 corresponds to the big gear 22 of the rear gear plate 2 to form a second low-speed gear, the small gear 31 of the front gear plate 1 corresponds to the big gear 32 of the rear gear plate 2 to form a third intermediate-speed gear, and the small gear 41 of the front gear plate 1 corresponds to the big gear 42 of the rear gear plate 2 to form a fourth high-speed gear. It should be noted that the number of the front gears is equal to the number of the rear gears, and the distances between the front gears and the corresponding rear gears are equal, so that the technical effect of controlling the clutch lever 3 to enable the front gear plate 1 to move forwards by about 2 cm to be separated from a transmission box 4 or to move backwards to be engaged with the transmission box 4 is realized. In addition, the number of gears on each of the front gear plate 1 and the rear gear plate 2 may be four, six, eight, or the like in other embodiments, and the number of speed gears is not limited to five in this embodiment.

Furthermore, a transmission box 4 is arranged between the front gear plate and the rear gear plate, a plurality (an odd number) of small gears are linearly arranged in the transmission box 4, and tails of the small gears located at two ends of the transmission box are exposed out of the transmission box, so as to be engaged with the front gear plate and the rear gear plate. A gear case 5 fixed to an edge of a triangular bracket is disposed around a middle of the transmission box 4. As shown in FIG. 2 which is a top view of the gear case, five strip-shaped gear grooves are formed in the gear case from inside to outside, and a top 6 of the transmission box 4 penetrates through the gear case 5 to be movably connected to a gear shift lever 7.

Furthermore, in this embodiment, a control panel 8 matched with the gear shift lever 7 and the clutch lever 3 is arranged on a bicycle beam, and the gear shift lever 7 and the clutch lever 3 can be conveniently operated through the control panel 8, so as to be accurately limited.

Furthermore, in this embodiment, a bolt lock 9 used for controlling a lock state of the clutch lever 3 is arranged on the control panel 8, and the lock bolt 9 can be locked or unlocked in time according to the separation or engagement state of the clutch lever 3, so as to assist in separation or engagement of the clutch lever 3.

Furthermore, in this embodiment, the gear shift lever 7 is hinged to a rear oblique beam of the triangular bracket of a bicycle and sequentially comprises, in a length direction, a control arm section at an upper end and a driven arm section at a lower end. It should be noted that the gear shift lever 7 formed by the control arm section and the driven arm section is a labor-saving lever, and that the control arm section and the driven arm section move oppositely, that is to say, when the gear shift lever 7 is used for gear shifting, the control arm section moves forwards, while the transmission box 4 connected with the driven arm section moves backwards, and so on.

Furthermore, in this embodiment, the clutch lever 3 is hinged to a front oblique beam of the triangular bracket and is partitioned by a hinge point into a driving clutch control arm and a driven clutch control arm. It should be noted that the clutch lever 3 formed by the driving clutch control arm and the driven clutch control arm in this embodiment is a labor-consuming lever, and that the driving clutch control arm and the driven clutch control arm are perpendicular to each other in an initial state, so that the clutch lever 3 can be mounted more conveniently, can be operated more easily and conveniently, and can be matched with the gear shift lever 7 to be designed in one control panel 8.

This embodiment further provides an operating method of a bicycle derailleur. The operating method particularly comprises the following steps:

When gear shifting is needed, the clutch lever 3 is controlled to enable the front gear plate 1 to automatically move forwards by about 2 cm to be separated from the transmission box 4, and then the gear shift lever 7 is controlled to drive the transmission box 4 to move forwards, backwards, leftwards, or rightwards in the gear case.

When the gear transmission box 4 moves to a target position (the gear required) in the gear case, the clutch lever 3 is controlled to drive the front gear plate 1 to move backwards to be engaged with the transmission box 4.

Furthermore, before being controlled to drive the front gear plate 1 to move forwards, the clutch lever 3 is locked. Correspondingly, before the clutch lever 3 drives the front gear plate 1 to move forwards, the corresponding bolt lock 9 needs to be unlocked first to set the clutch lever 3 free. When the front gear plate 1 is engaged with the transmission box 4, the clutch rod 3 is locked by the bolt lock 9, so that power is stably transmitted between the front gear plate 1 and the transmission box 4.

This embodiment further provides a bicycle which is provided with the bicycle derailleur. Gear shifting of the bicycle is achieved through the operating method of the bicycle derailleur. Therefore, the bicycle in this embodiment has the advantages (being simple in structure, low in manufacturing cost, durable, free of chain disengagement and breakage, and capable of changing the speed ratio more flexibly) of the bicycle derailleur, and has high application and promotion value.

INDUSTRIAL APPLICABILITY

The bicycle derailleur, the operating method thereof, and the bicycle of the invention have the advantages of being simple in structure, low in manufacturing cost, durable, free of chain disengagement and breakage, and capable of changing the speed ratio more flexibly, thereby having high application and promotion value and broad market prospects.

What is claimed is:

1. A bicycle derailleur, comprising a front gear plate and a rear gear plate, wherein a small gear of the front gear plate corresponds to a big gear of the rear gear plate to form a low-speed gear, and a big gear of the front gear plate corresponds to a small gear of the rear gear plate to form a high-speed gear;

a number of gears of the front gear plate is equal to a number of gears of the rear gear plate, and distances between the gears of the front gear plate and corresponding of the gears of the rear gear plate are equal;

a clutch lever can be controlled to enable the front gear plate to move forwards to be separated from a transmission box or to move backwards to be engaged with the transmission box;

the transmission box is arranged between the front gear plate and the rear gear plate; a group of small gears are linearly arranged in the transmission box, and a number of the small gears in the transmission box is an odd number; tails of the small gears located at two ends of the transmission box are exposed out of the transmission box and are engaged with the front gear plate and the rear gear plate; and a gear case fixed to an edge of a triangular bracket is disposed around a middle of the transmission box; a top of the transmission box penetrates through the gear case to be movably connected to a gear shift lever; and the clutch lever and the gear shift lever can be controlled to enable the transmission box to freely move forwards, backwards, leftwards or rightwards in the gear case to reach a desired gear.

2. The bicycle derailleur according to claim 1, wherein the front gear plate moves forwards to be separated from the transmission box by a distance of 1.5 cm to 2.5 cm.

3. The bicycle derailleur according to claim 2, wherein the front gear plate moves forwards to be separated from the transmission box by a distance of 2 cm.

4. The bicycle derailleur according to claim 1, wherein the number of the gears correspondingly arranged on each of the front gear plate and the rear gear plate is more than one, and the gears arranged on the front gear plate are in one-to-one correspondence with the gears arranged on the rear gear plate.

5. The bicycle derailleur according to claim 4, wherein five gears having different numbers of teeth are correspondingly arranged on each of the front gear plate and the rear gear plate, and the five gears correspondingly arranged on the front gear plate are in one-to-one correspondence with the five gears correspondingly arranged on the rear gear plate to form five speed gears.

6. The bicycle derailleur according to claim 5, wherein the gear case is disposed around the transmission box and is provided with, from inside to outside, strip-shaped gear grooves corresponding to the five speed gears.

7. The bicycle derailleur according to claim 1, wherein a control panel matched with the gear shift lever and the clutch lever is arranged on a bicycle beam.

8. The bicycle derailleur according to claim 7, wherein a bolt lock used for controlling a lock state of the clutch lever is arranged on the control panel.

9. The bicycle derailleur according to claim 1, wherein the gear shift lever is hinged to a rear oblique beam of the triangular bracket and sequentially comprises, in a length direction, a control arm section at an upper end and a driven arm section at a lower end, and the control arm section and the driven arm section move oppositely.

10. The bicycle derailleur according to claim 9, wherein the gear shift lever formed by the control arm section and the driven arm section is a labor-saving lever.

11. The bicycle derailleur according to claim 1, wherein the clutch lever is hinged to a front oblique beam of the triangular bracket and is partitioned by a hinge point into a driving clutch control arm and a driven clutch control arm.

12. The bicycle derailleur according to claim 11, wherein the clutch lever formed by the driving clutch control arm and the driven clutch control arm is a labor-consuming lever.

13. The bicycle derailleur according to claim 12, wherein the driving clutch control arm and the driven clutch control arm are located on a same axis.

14. An operating method of a bicycle derailleur, wherein before being controlled to drive a front gear plate to move forwards, a clutch lever is locked; correspondingly, before the clutch lever is controlled to drive the front gear plate to move forwards, a corresponding bolt lock is unlocked first to set the clutch lever free; and when the front gear plate is engaged with a transmission box, the clutch lever is locked by the bolt lock, so that power is stably transmitted between the front gear plate and the transmission box.

15. The operating method of a bicycle derailleur according to claim 14, wherein the clutch lever drives the front gear plate to move forwards by a distance of 2 cm.

16. A bicycle, comprising the bicycle derailleur according to claim 1.

17. A bicycle, comprising the bicycle derailleur according to claim 2.

18. A bicycle, comprising the bicycle derailleur according to claim 3.

19. A bicycle, comprising the bicycle derailleur according to claim 4.

20. A bicycle, comprising the bicycle derailleur according to claim 5.

21. A bicycle, comprising the bicycle derailleur according to claim 6.

22. A bicycle, comprising the bicycle derailleur according to claim 7.

23. A bicycle, comprising the bicycle derailleur according to claim 8.

24. A bicycle, comprising the bicycle derailleur according to claim 9.

25. A bicycle, comprising the bicycle derailleur according to claim 10.

26. A bicycle, comprising the bicycle derailleur according to claim 11.

27. A bicycle, comprising the bicycle derailleur according to claim 12.

28. A bicycle, comprising the bicycle derailleur according to claim 13.

* * * * *